United States Patent [19]
Woodroffe et al.

[11] 3,826,920
[45] July 30, 1974

[54] FLUORESCENT GAS ANALYZER WITH CALIBRATION SYSTEM

[75] Inventors: Jaime A. Woodroffe, Cambridge; John P. Appleton, Andover, both of Mass.

[73] Assignee: Massachusetts Institute of Technology, Cambridge, Mass.

[22] Filed: Apr. 12, 1973

[21] Appl. No.: 350,431

[52] U.S. Cl. ............... 250/373, 250/339, 250/343, 250/432, 250/435
[51] Int. Cl. ............................................. G01t 1/00
[58] Field of Search ............ 73/26.1; 250/301, 339, 250/343, 372, 373, 432, 435

[56] References Cited
UNITED STATES PATENTS

| | | | |
|---|---|---|---|
| 2,286,985 | 6/1942 | Hanson | 250/373 |
| 2,288,942 | 7/1942 | Doan | 250/435 |
| 2,736,813 | 2/1956 | Cherrier | 250/432 |
| 2,872,588 | 2/1959 | Barton | 250/373 |
| 3,496,489 | 2/1970 | Chi Lin | 250/435 |
| 3,507,987 | 4/1970 | Den Bosch | 250/339 |
| 3,510,648 | 5/1970 | Leger | 250/301 |
| 3,696,247 | 10/1972 | McIntosh et al. | 250/339 |

*Primary Examiner*—Harold A. Dixon
*Attorney, Agent, or Firm*—Arthur A. Smith, Jr.; Robert Shaw; Martin M. Santa

[57] ABSTRACT

A fluorescence gas analyzer for the measurement of concentrations of NO, $SO_2$, CO, $CO_2$ and other gases that appear in relatively small concentrations in a carrier gas. The carrier gas is subjected to ultraviolet radiation at predetermined wavelengths to effect fluorescence. The spectral wavelengths are chosen for the specific gas of interest. The intensity of the fluorescent radiation from the gas of interest is a measure of the concentration of that gas (NO, $SO_2$, etc.) in the carrier.

30 Claims, 5 Drawing Figures

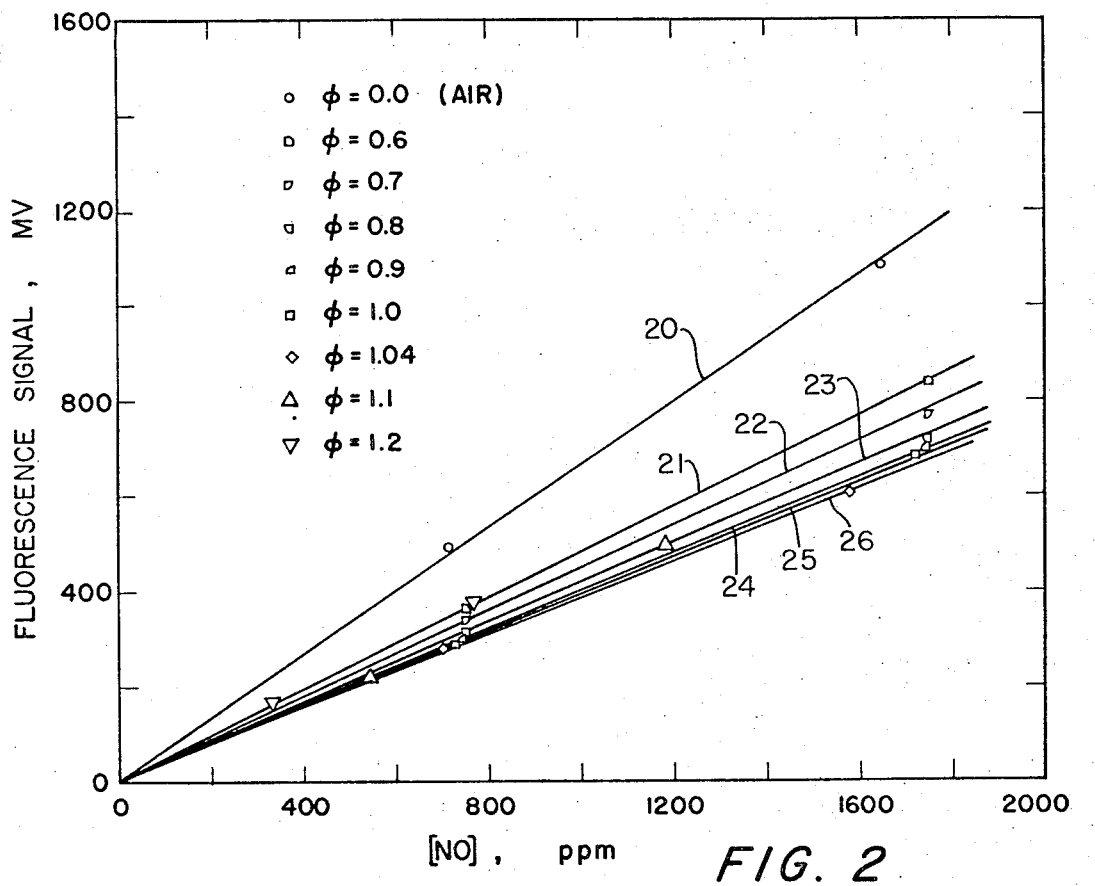
FIG. 2
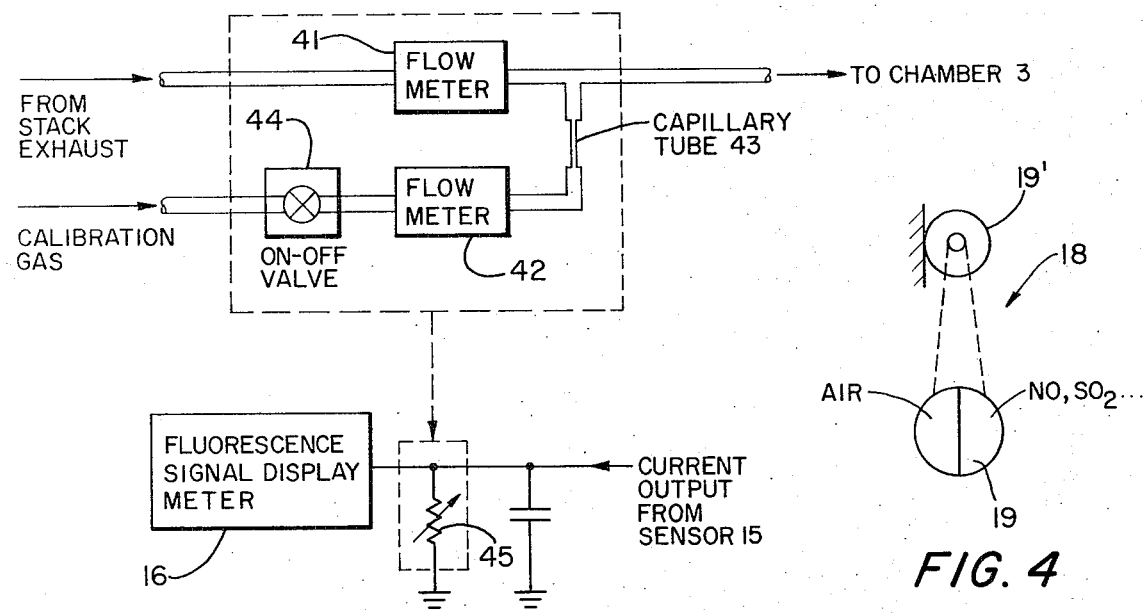
FIG. 3
FIG. 4

FLUORESCENT GAS ANALYZER WITH CALIBRATION SYSTEM

The research which led to the present invention was supported, in part, by the Advanced Research Projects Agency of the Department of Defense and monitored by the Office of Naval Research under Contract No. N00014-67-A-0204-0040 and ARPA Order No. 322.

The present invention relates to gas analyzers and, in particular, to gas analyzers employing fluorescence techniques.

A discussion of the present invention concepts as well as prior work by others in the concepts and in the field of interest is contained in the doctoral thesis of the inventor Woodroffe, the work upon which the thesis is based having been done under the supervision of the inventor Appleton. The thesis is entitled "Fluorescence Technique for Nitric Oxide and Sulfur Dioxide Detection", deposited in the M.I.T. Library system on or about Feb. 14, 1974.

Federal air pollution regulations in the United States now require every automobile manufacturer to certify that its vehicles will meet certain standards for NO,CO, and hydrocarbon emission. Local regulations now require electric power plants to measure their NO and $SO_2$ emission to assure that they meet standards. Every state is now expected to draw up plans to monitor continuously the air quality in each region.

Eventually, every vehicle assembly plant, every power plant stack, and every community will need gas analyzers for each pollutant, which are capable of measuring low concentrations and of discriminating against all the other species that may be present in an exhaust gas or a polluted atmosphere. Normally, one analyzer is required for each pollutant species so that the cost, ease of operation, length of unattended operation and maintenance requirements become very important parameters. The demand for suitable instruments is great. The specific performance requirements for an analyzer depend on the pollutant and on whether the requirement is for a vehicular source exhaust gas, stationary source exhaust gas or ambient air.

Although the techniques and the apparatus hereinafter noted have broad applicability, the instant specification is devoted mostly to describing such techniques and apparatus in conjunction with NO and $SO_2$ concentrations in exhaust gases from combustion sources and for measuring $SO_2$ concentrations in ambient air. Accordingly, a principal object of the present invention is to provide a novel system and method for detecting small quantities of NO and/or $SO_2$ in a carrier gas.

There are many methods of measuring NO and $SO_2$ concentrations in gas mixtures available now. For NO, they are colorimetry, non-dispersive infrared absorption spectroscopy, chemiluminescence, dispersive absorption spectroscopy, second derivative spectroscopy, and Raman scattering. For $SO_2$, they are colorimetry, conductimetry, non-dispersive infrared and ultraviolet absorption spectroscopy, flame photometry and gas chromatography-flame photometry, coulometry, electrochemical tranducer analysis, correlation spectroscopy, condensation nuclei formation, dispersive absorption spectroscopy, second derivative spectroscopy and Roman scattering. The prior art methods just mentioned are discussed in some detail in the thesis; since these prior methods have relevance only to the extent that they are directed to solving the same problem as is the present invention, no further comment thereon need be made. It is sufficient to note that the methods (and apparatus adapted to implement the methods) suffer from one or more of the following drawbacks in that they: are relatively expensive, are not linear, have slow response, have interference from other species, require liquid reagents or a supply of other gases such as compressed hydrogen, are not useful on a continuous flow basis, are useful for detecting only one gas in a sample.

Thus, another object of the present invention is to provide a novel NO and/or $SO_2$ analyzer that is relatively inexpensive to manufacture and which is suitable for stationary installation but which can be made portable.

Still another object is to provide in such analyzer the capability of fast and accurate response and one that requires a relatively small amount of maintenance.

A further object is to provide a gas analyzer that is adapted to be adjusted to take into consideration changes in the composition of the carrier gas.

A still further object is to provide a gas analyzer that can detect small quantities of NO and $SO_2$ but which can detect $NO_2$, CO and $CO_2$, as well, and an analyzer that is adapted to sense one or more of the foregoing gases in one instrument.

A still further object is to provide a gas analyzer of broad scope.

These and still further objects are evident in the description that follows and are particularly delineated in the appended claims.

The objects of the invention are broadly embodied in a fluorescence gas analyzer. The analyzer includes a source of radiation adapted to direct radiation into a carrier gas which contains small amounts or traces of a gaseous species to-be-detected. There is provided a fluorescence chamber to receive the carrier. The radiation is directed into the chamber after first having passed through means for selectively choosing from the radiation that part of the wavelength spectrum capable of exciting fluorescence in said gaseous species. The analyzer contains a sensor to measure the fluorescence intensity level resulting from the irradiation and means for relating said level to the amount of trace gas in the carrier. The geometry of the chamber with respect to the sensor position is particularly adapted to minimize scattered radiation so that the sensor output is substantially a function of fluorescence only.

The operation of the present analyzer is based on the principle of fluorescence. Fluorescence in NO is obtained when an NO molecule, having been excited to an upper electronic state by radiation of a suitable wavelength, decays back to the ground state by emitting a photon. NO absorbs strongly in UV below 2268 A. The absorption occurs in the $\gamma$ band, which corresponds to transitions between the $X^2\pi_r$ (ground) and $A^2\Sigma^+$ electronic states. Radiation in the wavelength interval 2250 A – 2268 A is the most convenient. This interval corresponds to the $\gamma(0,0)$ band. The fluorescence will then appear over several vibrational bands from 2250 A to 3170 A.

Fluorescence in $SO_2$ can be excited through absorption in the range 2500 A – 3200 A and the range 1900 A – 2300 A. In the first case, the fluorescence is easily quenched by air. Below 2300 A, however, quenching is slight. With exciting radiation at 2130 A, the fluorescence appears from 2130 A to 4200 A.

Other molecules have their own absorption-fluorescence spectra.

This device has linear response, fast response, little interference from other species, does not require a compressed hydrogen supply, and because of its simplicity, it should be cheap and easy to maintain.

The invention is hereinafter described with reference to the accompanying drawing in which:

FIG. 2 is a graph of measured NO fluorescence vs. NO concentration in exhaust gas mixtures for various stoichiometric coefficients;

FIG. 3 is a schematic diagram of an in situ calibration system;

FIG. 4 is a schematic diagram of a chopper that can be employed in the analyzer of FIG. 1.

Figure 1:
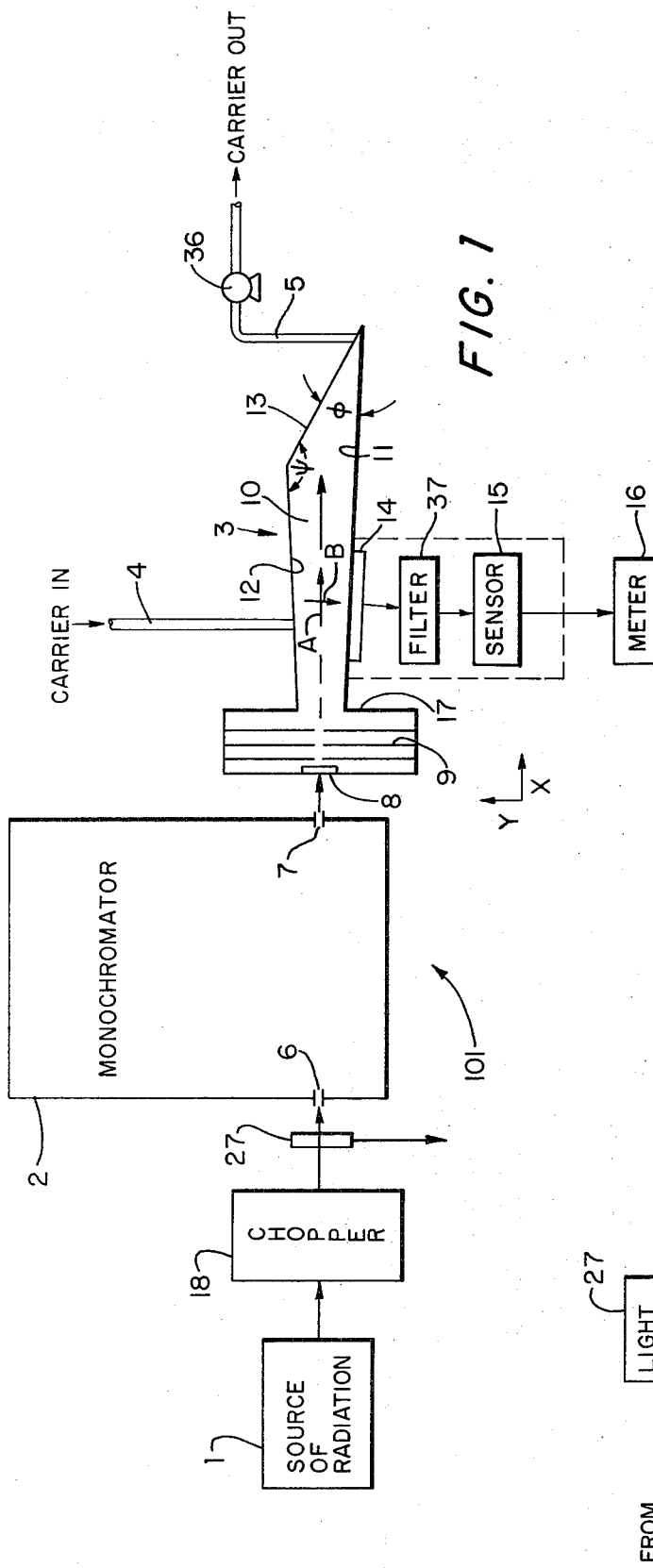
FIG. 1 is a schematic diagram of a fluorescence gas analyzer embodying the present concepts.

With reference now to FIG. 1, a fluorescence gas analyzer is shown generally at 101. The analyzer includes a source of ultraviolet radiation 1 which is a spectrally continuous source of such radiation. The source 1 can be continuous-wave ultraviolet light source, such as, for example, a xenon-mercury arc lamp, but, preferably, is a pulsed discharge light source of longevity. A carrier containing a gaseous species of interest is introduced to a fluorescence chamber 3 at the chamber inlet labeled 4 and is removed from the chamber at its outlet 5. The carrier, which can be, for example, exhaust from a stack of an electric generating plant, is irradiated in the manner now noted.

The radiation from the source 1 is passed through a monochromator 2 or other means for choosing from the radiation wavelengths capable of exciting fluorescence in the gas of interest. A xenon-mercury, high-pressure, arc-discharge lamp of the type used in the work reported in said thesis is nearly a point source and can, therefore, be focused to a small spot at the entrance slit shown at 6 to the monochromator. The radiation emerges from the monochromator through a slit 7 and enters the chamber through a quartz window 8. Baffles 9 within the chamber serve to prevent light scattered by the window 8 from entering the main body or cavity 10 of the chamber within which most of the irradiation of the carrier takes place. The baffles thereby assure that the light within the chamber 3, or, more precisely, within the cavity 10 thereof, does not strike the chamber walls numbered 11 and 12, but, rather, strikes the wall labeled 13, for purposes hereinafter explained. In this way the carrier within the chamber 3 is irradiated and the particular gas of interest fluoresces. To simplify the present explanation, the incoming radiation is directed generally in the X direction as indicated by the arrow shown at A, and the detected fluorescence passes from the chamber 3 in the −Y direction, as indicated by the arrow shown at B, to be detected by a photomultiplier tube, light-sensitive diode or other photodetector or sensor 15.

The fluorescence passes from the chamber 3 through a further quartz window 14 and through an optical filter 37 which filters out all except the desired fluorescence radiation. The sensor 15 produces an electrical signal which is fed to a voltmeter or electrometer 16 that may be calibrated to read the concentration in parts-per-million or parts-per-billion of the gas or gaseous species to-be-analyzed.

It is the intention in the disclosed system that fluorescence only in the region of the chamber about the intersection points of the arrows A and B in FIG. 1 should affect the sensor 15. The chamber 3 is designed in such fashion that radiation striking the upper wall 12 and the wall 13 shall not reflect upon the sensor; so the sensor notes only the downwardly-directed fluorescence from said region. Toward this end the main body or cavity 10 of the chamber 3 has a four-sided cross-section as shown, the side where the radiation enters being designated 17 and being open; for present purposes the side 17 is oriented in the Y direction. The angles between the sides 11 and 12 adjacent the side 17 and the side 17 are slightly greater than 90°, the angle between the side 12 facing the sensor and the side 13 not adjacent to the entrance side 17 (i.e., the angle $\psi$) is highly obtuse; and the angle between the side 11 on which the sensor is mounted and the side 13 not adjacent to the entrance side (i.e., the angle $\theta$) is highly acute. The chamber 3 in experimental work done was made of aluminum, and all interior surfaces were painted flat black. This together with the chamber geometry assure that no scattered light strikes the sensor from a wall directly illuminated by the incoming radiation beam represented by the arrow A, the that a minimum of second-surface scattering strikes the sensor. The chamber 3 is adapted, therefore, in geometry and other characteristics to assure that the only light that strikes the sensor 15 is the fluorescence that propagates orthogonally downward from the region of the intersection of the arrows A and B in FIG. 1. Furthermore, it has been found for present purposes, that the relationship between fluorescence of the gaseous species and concentration thereof is linear; however, a given amount of trace gas in a carrier will not give the same signal at the meter 16 when the carrier is a particular mixture of gases as it will at some other mixture of gases because of quenching, as now explained.

Quenching occurs when a molecule, having been excited to an upper electronic state by absorption of radiation, is deexcited to a lower electronic state by collisions with other molecules before it has spontaneously emitted fluorescent radiation. The probability of quenching per collision depends on the identity of the collision partner, so that the total quenching rate is a function of the concentration of the major components of the carrier, as shown in FIG. 2 for NO. (Data similar to that displayed in FIG. 2 have been obtained for $SO_2$ and could be obtained for other species.)

In FIG. 2 each of the lines 20–26 represents fluorescence as a function of NO concentration for a particular carrier, line 20 being for an air carrier, line 21 for the dry exhaust gas of combustion at stoichiometric coefficient $\phi$ of 0.6 and 1.2, line 22 for exhaust gas of $\phi$ equal to 0.7, line 23 for 0.8 and 1.1, line 24 for 0.9, line 25 for 1.0, and line 26 for 1.04. It should be clear from the explanation in this and the previous paragraph, particular level of fluorescence, the signal from the meter 16 has meaning only to the extent that such reading takes into consideration the composition of the carrier, and this is done by compensating the meter in the manner discussed below.

For each particular carrier gas, the relationship between the fluorescence intensity and the concentration is a straight line. To obtain the concentration from a measurement of the fluorescence, it is only necessary to know the slope of this line, that is, the change in the magnitude of the fluorescence signal per unit change in the concentration of the species of interest. Hereinafter this magnitude is referred to as the calibration characteristic.

By adding a very small amount of gas (one percent or less at the carrier flow) with a known high concentration of the species of interest (on the order of one hundred times the expected concentration in the carrier) to a carrier sample, it is possible to change the species concentration present in the carrier without changing the calibration characteristic corresponding to the particular carrier gas. The practice of removing all the carrier gas from the instrument to be calibrated and replacing it with a calibration gas is well known. This procedure, however, would give no information whatever about the fluorescent signal per unit concentration in the particular carrier gas if the composition of the carrier differs at all from that of the carrier gas used for calibration; this will almost always be the case in analyzing combustion product gases.

The change in the output signal of the photosensor caused by the change in concentration of the gas of interest in the stream passing through the fluorescence chamber can be measured. By measuring the flow rates of the carrier and of the added calibration gas, and with prior knowledge of the concentration of the gas of interest in the added gas, it is possible to obtain the calibration characteristic from the difference in signals with and without the added gas. Mathematically, the calibration characteristic is:

$$K = q_c/q_o \, (C_c/V - V_o)$$

where $q_c$ is the known measured molar flow rate of the added gas, and is much smaller than $q_o$; $q_o$ is the known measured molar flow rate of the carrier; $C_c$ is the concentration of the particular gas in the added gas; $V$ is the signal measured with the added gas; $V_o$ is the signal measured before adding the calibration gas.

With reference now to FIG. 3, the stack exhaust carrier gas flow is measured by a flowmeter 41, and that of the added gas by a flowmeter 42. A capillary tube 43 or other calibrated flow control device restricts the flow of added gas to less than 1 percent of the carrier flow rate. With the on-off valve shown at 44 in the closed position, the signal $V_o$ is read on the fluorescence signal display meter 16. The valve 44 is then opened and the signal V is read on the meter 16. Using the measured flow rates from flowmeters 41 and 42, the known concentration of the gaseous species of interest in the added gas, the the difference between V and $V_o$, the carrier characteristic K can then be computed by using the equation above. The concentration $C_o$ in the carrier gas is calculated by using $$C_o = KV_o$$

A variable resistor 45 (or the voltage applied to sensor 15, when it is a photomultiplier tube) is then adjusted until the numerical value of the signal displayed on the meter scale is equal to the numerical value of the concentration $C_o$. These functions can be carried out manually or suitably designed electronic logic circuits.

Figure 5:
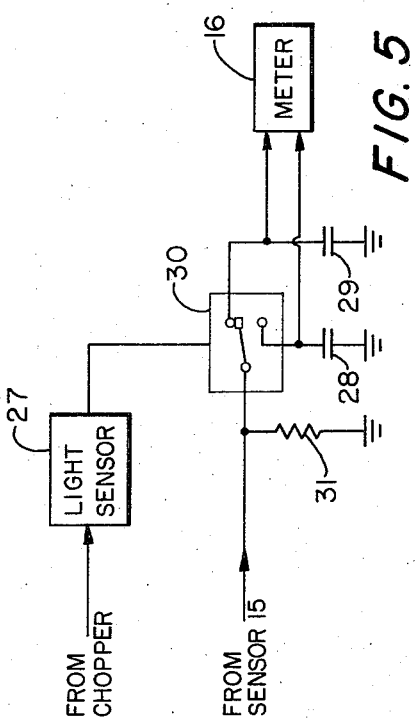
FIG. 5 is a schematic diagram of the chopper electronics.

The analyzer 101 can also include a chopper 18. The chopper 18, as shown in FIG. 4, comprises a chopper wheel 19 which is driven at about 300 RPM by an electric motor 19'. The chopper wheel is hollow and transparent and contains air, argon or some other non-absorbing gas on one side, as shown, and the gas of interest on the other. The chopper, therefore, alternately passes all the radiation from the source 1 and all the radiation except that capable of being absorbed by the species whose concentration is to be measured. A light sensor 27 placed between the chopper 18 and the monochromator and in the path of the source radiation is alternately exposed to the two conditions of radiation just noted. With reference to FIG. 5, the sensor 27 provides an electric signal which is in the form of a train of pulses. The train is connected to the coil of a reed switch 30 which connects the output of the sensor 15 to a capacitor 28 or a capacitor 29 as alternate conditions, depending on the presence or absence of a pulse from the sensor 27. A resistor 31 transforms the current output of the sensor 15 into a voltage. The meter 16 in this situation measures the difference between the voltage on the capacitor 28 and the voltage on the capacitor 29. This chopper can improve the sensitivity of the instrument by preferentially canceling out scattered light and sensor 15 dark noise signals and not the fluorescence signal.

By properly choosing the wavelength of the radiation entering the chamber proper 10 and by choosing the wavelength at which the emitted radiation is measured by the sensor 15, it is possible to detect fluorescence from only one species in the carrier gas mixture. The intensity of the fluorescence can then be related to the concentration of that species in the carrier; the measured signal is a straight line function of the concentration, as above noted. The apparatus disclosed has demonstrated capability of measuring from 1 to 1000 ppm of either NO or $SO_2$ in a combustion-gas carrier and $SO_2$ in the range of 10 parts per billion to 1 part per million in an ambient-air carrier. The analyzer 101 is intended to measure a species concentration that is a very small percentage of the carrier.

A few random comments are contained in this paragraph. Work done to date indicates that a gas pressure within the chamber 3 between 0.1 torr and 100 torr is best for the species NO and $NO_2$ while a chamber gas of 100 torr to 10 atmospheres is best for the species $SO_2$. For operating conditions in which pressures other than atmospheric are employed, the windows 8 and 14 must be appropriately sealed. The carrier gas is drawn into the chamber 3 by a small gas pump 36. The radiation source shown is a lamp, but it could be a laser operable to lase at the frequency of interest, e.g., a hydrogen laser or a laser in combination with frequency doubling or mixing means.

Further modifications of the invention herein disclosed will occur to persons skilled in the art and all such modifications are deemed to be within the spirit and scope of the invention as defined by the appended claims.

What is claimed is:

1. A fluorescence gas analyzer that includes, in combination: a source of radiation; means for selectively choosing radiation at wavelengths capable of exciting fluorescence in a species of interest from said source of radiation; a fluorescence chamber to receive the gas to be analyzed and having an entrance opening to pass said selected radiation into the chamber to irradiate the gas; sensing means to measure the fluorescence intensity from the species of interest, comprising a photodetctor sensor and an optical filter in front of the photodetector sensor, the filter acting to remove all radiation at the excitation wavelengths and to pass longer wavelength fluorescence frequencies, the geometry of said chamber being adapted to minimize scattered radiation to the sensor; and means for in situ calibration, the means for in situ calibration comprising means for passing a constant flow, $q_o$, of a sample gas containing the gaseous species of interest through the chamber and whose concentration is to be measured and noting the photodetctor sensor output signal, $V_o$, means for adding a gas containing a known concentration, $C_c$, of said species to the sample gas stream at a constant flow rate, $q_c$, sufficient to effect a change, $V - V_o$, in the sensor output signal, the change being noted, means for determining the ratio of the added gas flow rate to the sample flow rate, $q_c/q_o$, and means for compensating the analyzer output on the basis of the change in the sensor output signal, $V - V_o$, the ratio of the flow rates, $q_c/q_o$, and the known concentration, $C_c$, of the species in the added gas stream.

2. A fluorescence gas analyzer as claimed in claim 1 in which the source is a source of ultraviolet radiation and is a spectrally continuous source of said radiation.

3. A fluorescence gas analyzer as claimed in claim 2 in which the source is a continuous-wave, light source.

4. A fluorescence gas analyzer as claimed in claim 3 in which the source is a xenon-mercury arc lamp.

5. A fluorescence gas analyzer as claimed in claim 2 in which the source is a pulsed discharge light source.

6. A fluorescence gas analyzer as claimed in claim 1 in which the means for selectively choosing excitation radiation is a monochromator.

7. A fluorescence gas analyzer as claimed in claim 1 in which the means for selectively choosing excitation radiation is an optical interference filter.

8. A fluorescence gas analyzer as claimed in claim 1 wherein the photodetector is a photomultiplier tube.

9. A fluorescence gas analyzer as claimed in claim 1 wherein the photodetector is a solid-state photodiode.

10. A fluorescence gas analyzer as claimed in claim 1 having an inlet to permit the gas to flow into the chamber and an outlet to permit the gas to flow from the chamber, gas movement being on a continuous-flow basis.

11. A fluorescence gas analyzer as claimed in claim 1 including additionally a rotatable chopper having one semi-circle thereof filled with the gaseous species whose concentration is to be measured, and the other semi-circle thereof with a non-absorbing gas.

12. A fluorescence gas analyzer as claim in claim 1 in which the relative inclination of the walls of the chamber is chosen so as to assure that no scattered light strikes the sensor from a wall directly illuminated by the incoming radiation beam and that a minimum of second-surface scattering strikes the sensor.

13. A fluorescence gas analyzer as claimed in claim 1 in which the means for determining the ratio, $q_c/q_o$, comprises means for measuring the flow rate, $q_o$, of the sample through the chamber and means for measuring the flow rate, $q_c$, of the added gas.

14. A fluorescence gas analyzer that includes, in combination: a source of radiation; means for selectively choosing radiation at wavelengths capable of exciting fluorescence in a species of interest from said source of radiation; a fluorescence chamber to receive the gas to be analyzed and having an entrance opening to pass said selected radiation into the chamber to irradiate the gas; and sensing means to measure the fluorescence intensity from the species of interest, comprising a photodetctor sensor and an optical filter in front of the photodetector sensor, the filter acting to remove all radiation at the excitation wavelengths and to pass longer wavelength fluorescence frequencies, the geometry of said chamber being adapted to minimize scattered radiation to the sensor, and a series of baffles between the entrance opening of the chamber and the main body of the chamber.

15. A fluorescence gas analyzer as claimed in claim 14 and having a window between the means for selectively choosing excitation radiation and the baffles that transmits these wavelengths.

16. A fluorescence gas analyzer that includes, in combination: a source of radiation; means for selectively choosing radiation at wavelengths capable of exciting fluorescence in a species of interest from said source of radiation; a fluorescence chamber to receive the gas to be analyzed and having an entrance opening to pass said selected radiation into the chamber to irradiate the gas; and sensing means to measure the fluorescence intensity from the species of interest, comprising a photodetector sensor and an optical filter in front of the photodetector sensor, the filter acting to remove all radiation at the excitation wavelengths and to pass longer wavelength fluorescence frequencies, the geometry of said chamber being adapted to minimize scattered radiation to the sensor, the main body or cavity of the chamber having a four-sided cross-section, the angles between the side where the radiation enters the chamber and the two adjacent sides being slightly greater than 90°, the angle between the side facing the sensor and the side not adjacent to the entrance side being highly obtuse, and the angle between the side on which the sensor is mounted and the side not adjacent to the entrance side being highly acute.

17. A fluorescence gas analyzer as claimed in claim 16 that further includes a window in the chamber, which window transmits all fluorescence radiation.

18. A fluorescence gas analyzer that includes, in combination: a source of radiation; means for selectively choosing radiation at wavelengths capable of exciting fluorescence in a species of interest from said source of radiation; a fluorescence chamber to receive the gas to be analyzed and having an entrance opening to pass said selected radiation into the chamber to irradiate the gas; and sensing means to measure the fluorescence intensity from the species of interest, comprising a photodetector sensor and an optical filter in front of the photodetector sensor, the filter acting to remove all radiation at the excitation wavelengths and to pass longer wavelength fluorescence frequencies, the sensor being positioned to substantially eliminate impingement of source radiation on it, the geometry of said chamber and its interior surfaces being adapted to minimize surface scattered radiation reaching the sensor so that substantially the only radiation that strikes the sensor is the fluorescence, and the chamber gas pressure being maintained between 0.1 torr and 100 torr.

19. A fluorescence gas analyzer that includes, in combination: a source of radiation; means for selectively choosing radiation at wavelengths capable of exciting fluorescence in a species of interest from said source of radiation; a fluorescence chamber to receive the gas to be analyzed and having an entrance opening to pass said selected radiation into the chamber to irradiate the gas; and sensing means to measure the fluorescence intensity from the species of interest, comprising a photodetector sensor and an optical filter in front of the photodetector sensor, the filter acting to remove all radiation at the excitation wavelengths and to pass longer wavelength fluorescence frequencies, the sensor being positioned to substantially elminate impingement of source radiation on it, the geometry of said chamber and its interior surfaces being adapted to minimize surface scattered radiation reaching the sensor so that substantially the only radiation that strikes the sensor is the fluorescence, and the chamber gas pressure being maintained between 100 torr and 10 atmospheres.

20. A gas analyzer instrument for detecting a gaseous species in a sample gas stream containing a number of gases that comprises: means for passing a sample of the gas stream through the instrument at a constant flow rate, $q_o$; means for obtaining an output signal, $V_o$, which bears relationship to the concentration of the gaseous species in the gas stream; means for adding a gas containing a known concentration, $C_c$, of said species to the sample gas at a constant flow rate, $q_c$, sufficient to effect a change, $V - V_o$, in the instrument output signal, such change being noted; means for determining the ratio, $q_c/q_o$, of the added gas flow rate, $q_c$, to the sample gas flow rate, $q_o$, and obtaining the calibration characteristic of the instrument on the basis of the change in the output signal, $V - V_o$, the ratio of the flow rates, $q_c/q_o$, and the known concentration, $C_c$, of the said species in the added gas stream.

21. A gas analyzer as claimed in claim 20 in which the means for determining the ratio $q_c/q_o$, comprises means for measuring the flow rate, $q_o$, of the sample through the chamber and means for measuring the flow rate, $q_c$, of the added gas.

22. A fluorescence gas analyzer that includes, in combination: a source of radiation adapted to provide light at wavelengths capable of exciting fluorescence in a gaseous species of interest; a fluorescence chamber to receive the gas to be analyzed and having an entrance opening to pass said wavelengths into the chamber to irradiate the gas; and a sensor positioned to receive and to measure the fluorescence intensity from the species, the geometry of said chamber being adapted to minimize scattered radiation to the sensor, the main body or cavity of the chamber having a four-sided cross-section, the angles between the side where the radiation enters the chamber and the two adjacent sides being slightly greater than 90°, the angle between the side facing the sensor and the side not adjacent to the entrance side being highly obtuse, and the angle between the side at which the sensor is mounted and the side not adjacent to the entrance side being highly acute.

23. A fluorescence gas analyzer that includes, in combination: a source of radiation adapted to provide light at wavelengths capable of exciting fluorescence in a gaseous species of interest; a fluorescence chamber to receive a sample of the gas to be analyzed and having an entrance opening to pass said wavelengths into the chamber to irradiate the gas; a sensor positioned to receive and to measure the fluorescence intensity from the species and provide an output signal $V_o$, the geometry of said chamber being adapted to minimize scattered radiation to the sensor; and means for in situ calibration, said means for in situ calibration comprising means for for passing the sample gas through the instrument at a constant flow rate, $q_o$, means for measuring the sensor output signal, $V_o$, which bears relationship to the concentration of the gaseous species in the sample gas, means for adding a gas containing a known concentration, $C_c$, of said species to the sample gas at a constant flow rate, $q_c$, sufficient to effect a change, $V - V_o$, in the sensor output signal, such change being noted, means for determining the ratio, $q_c/q_o$, of the added gas flow rate, $q_c$, to the sample gas flow rate, $q_o$, and obtaining the calibration characteristic of the instrument on the basis of the change in the output signal, $V - V_o$, the ratio of the flow rates, $q_c/q_o$, and the known concentration, $C_c$, of the said species in the added gas.

24. A fluorescence gas analyzer as claimed in claim 23 in which the source is a source of ultraviolet radiation and is a spectrally continuous source of said radiation.

25. A fluorescence gas analyzer as claimed in claim 24 in which the source is a pulsed discharge light source.

26. An analyzer as claimed in claim 23 in which the source of radiation is a laser.

27. An analyzer as claimed in claim 26 that includes means for mixing the laser radiation to provide radiation at said wavelengths.

28. A fluorescence gas analyzer as claimed in claim 23 in which the relative inclination of the walls of the chamber is chosen so as to assure that no scattered light strikes the sensor from a wall directly illuminated by the incoming radiation beam and that a minimum of second-surface scattering strikes the sensor.

29. A method of in situ calibration of a gas analyzer instrument whose output signal is linear and whose calibration characteristic is sensitive to the composition of the background gas, such instrument being used for detecting a particular gaseous species in a gas stream containing a number of gases, that comprises: passing a sample of the gas stream through the instrument at a constant flow rate, $q_o$; obtaining an output signal, $V_o$, which bears relationship to the concentration of the particular gaseous species in the gas stream; adding a gas containing a known concentration, $C_c$, of the particular gas to the sample gas stream at a constant flow rate, $q_c$, sufficient to effect a change, $V - V_o$, in the instrument output signal; noting the change, $V - V_o$, in said output signal as a consequence of the particular gaseous species thereby added; and calibrating the instrument on the basis of the change in the output signal, $V - V_o$, the ratio of flow rates, $q_c/q_o$, and the known concentration, $C_c$, of the species in the added gas stream.

30. A method of in situ calibration as claimed in claim 29 in which the calibration characteristic is designated K and is the change in instrument output signal per unit change in the concentration of said particular gaseous species in the sample and may be determined from the following approximate expression:

$$K = q_c/q_o \, (C_c/V - V_o), \text{ where}$$

$q_c$ is much smaller than $q_o$.

* * * * *